United States Patent
Yamashita

(10) Patent No.: US 8,073,091 B2
(45) Date of Patent: Dec. 6, 2011

(54) SIGNAL PROCESSING METHOD AND CIRCUIT TO CONVERT ANALOG SIGNAL TO DIGITAL SIGNAL

(75) Inventor: Kenji Yamashita, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 491 days.

(21) Appl. No.: 12/320,324

(22) Filed: Jan. 23, 2009

(65) Prior Publication Data

US 2009/0196389 A1 Aug. 6, 2009

(30) Foreign Application Priority Data

Jan. 31, 2008 (JP) ................................ 2008/020601

(51) Int. Cl.
 *H04L 7/04* (2006.01)

(52) U.S. Cl. ........ 375/362; 375/354; 375/355; 375/371; 341/155

(58) Field of Classification Search .................. 375/354, 375/355, 362, 371; 341/155
See application file for complete search history.

(56) References Cited

U.S. PATENT DOCUMENTS

| | | | |
|---|---|---|---|
| 6,097,444 A | 8/2000 | Nakano | |
| 6,700,570 B2 | 3/2004 | Tachibana et al. | |
| 2002/0018125 A1 | 2/2002 | Tachibana et al. | |
| 2006/0197692 A1* | 9/2006 | Gong et al. ................. | 341/155 |
| 2007/0047690 A1* | 3/2007 | Zhao et al. ................. | 375/376 |

FOREIGN PATENT DOCUMENTS

| | | |
|---|---|---|
| JP | 2000-47649 | 2/2000 |
| JP | 2000-89709 | 3/2000 |
| JP | 2001-356729 | 12/2001 |
| JP | 2004-144842 | 5/2004 |

* cited by examiner

*Primary Examiner* — Curtis Odom
(74) *Attorney, Agent, or Firm* — McGinn IP Law Group, PLLC

(57) ABSTRACT

A phase determination unit in a signal processing circuit generates sampling clocks with different phases in a clock generator and sequentially provides them to an analog-to-digital convertor. Then, the phase determination unit obtains differences between each adjacent two signal levels in each sampled digital signal by use of the sampling clocks, and monitors a polarity change in the differences, extracts a more inappropriate phase for use in sampling from phases of the sampling clocks on the basis of the absolute values of the differences where the polarity change is detected, and determines an antiphase of the extracted phase as a phase of the sampling clock to be provided to the analog-to-digital convertor.

11 Claims, 19 Drawing Sheets

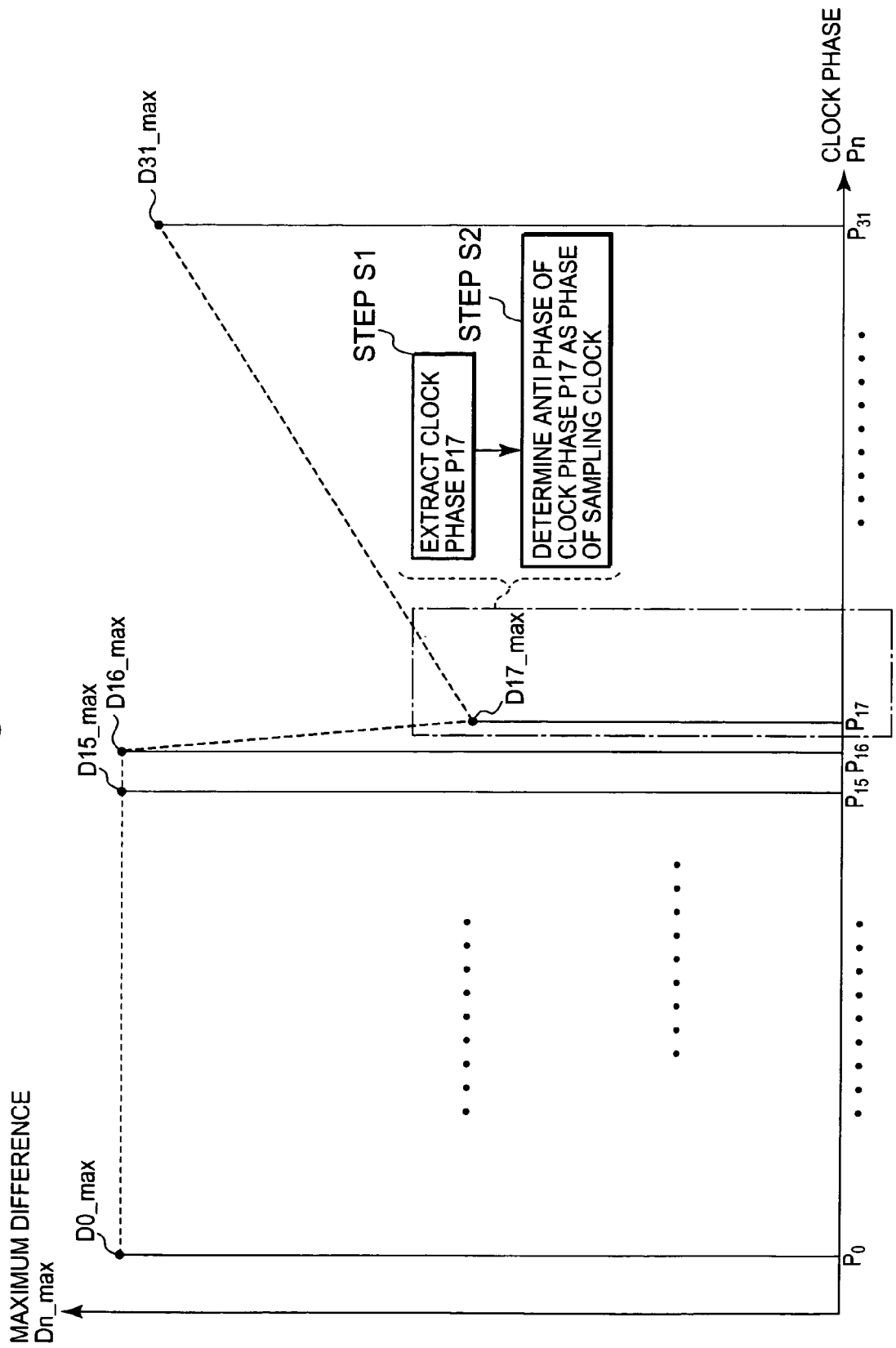

Fig. 10

| SAMPLING CLOCKS Cn | EFFECTIVE IMAGE AREA START POINTS HcS | EFFECTIVE IMAGE AREA END POINTS HcE | POINT DIFFERENCE HcE-HcS | PHASE SELECTION |
|---|---|---|---|---|
| C0 | PULSE PLs | PLe | PLe-PLs | O |
| C1 | PLs | PLe | PLe-PLs | |
| C2 | PLs | PLe | PLe-PLs | |
| C3 | PLs | PLe | PLe-PLs | |
| C4 | PLs-1 | PLe | PLe-PLs+1 | |
| C5 | PLs-1 | PLe-1 | PLe-PLs | |
| C6 | PLs-1 | PLe-1 | PLe-PLs | |
| C7 | PLs-1 | PLe-1 | PLe-PLs | |

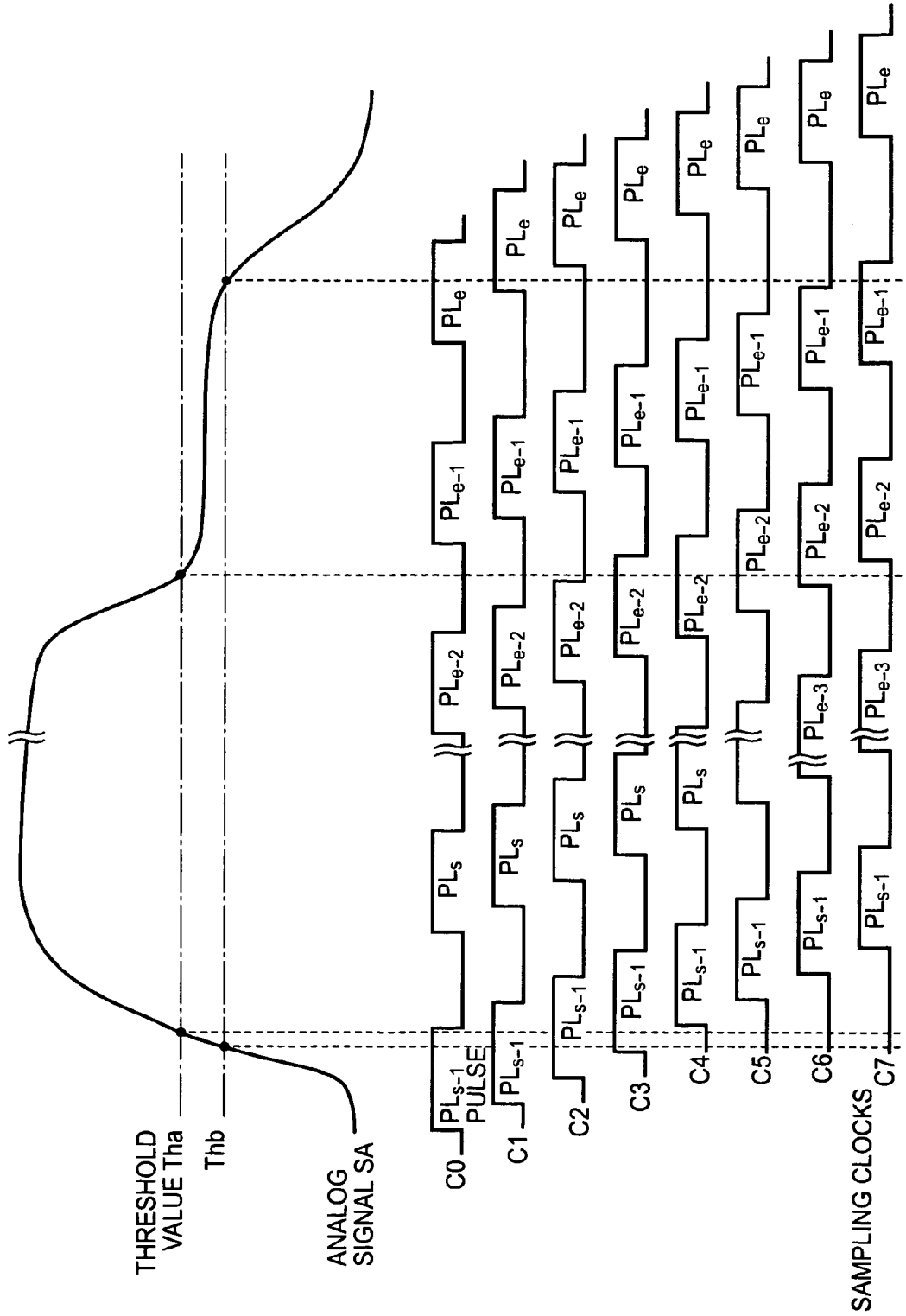

Fig. 12

| SAMPLING CLOCKS Cn | THRESHOLD VALUE Tha | | | | Thb | | | |
|---|---|---|---|---|---|---|---|---|
| | EFFECTIVE IMAGE AREA START POINTS HcS | EFFECTIVE IMAGE AREA END POINTS HcE | POINT DIFFERENCE HcE-HcS | PHASE SELECTION | HcS | HcE | HcE-HcS | PHASE SELECTION |
| C0 | PULSE PLs | PLe-2 | PLe-PLs-2 | | PLs | PLe | PLe-PLs | |
| C1 | PLs | PLe-2 | PLe-PLs-2 | ○ | PLs | PLe | PLe-PLs | |
| C2 | PLs | PLe-2 | PLe-PLs-2 | | PLs | PLe | PLe-PLs | |
| C3 | PLs | PLe-2 | PLe-PLs-2 | | PLs | PLe | PLe-PLs | |
| C4 | PLs-1 | PLe-2 | PLe-PLs-1 | | PLs-1 | PLe-1 | PLe-PLs-1 | |
| C5 | PLs-1 | PLe-2 | PLe-PLs-1 | | PLs-1 | PLe-1 | PLe-PLs | |
| C6 | PLs-1 | PLe-2 | PLe-PLs-1 | | PLs-1 | PLe-1 | PLe-PLs | |
| C7 | PLs-1 | PLe-2 | PLe-PLs-2 | | PLs-1 | PLe-1 | PLe-PLs | ○ |

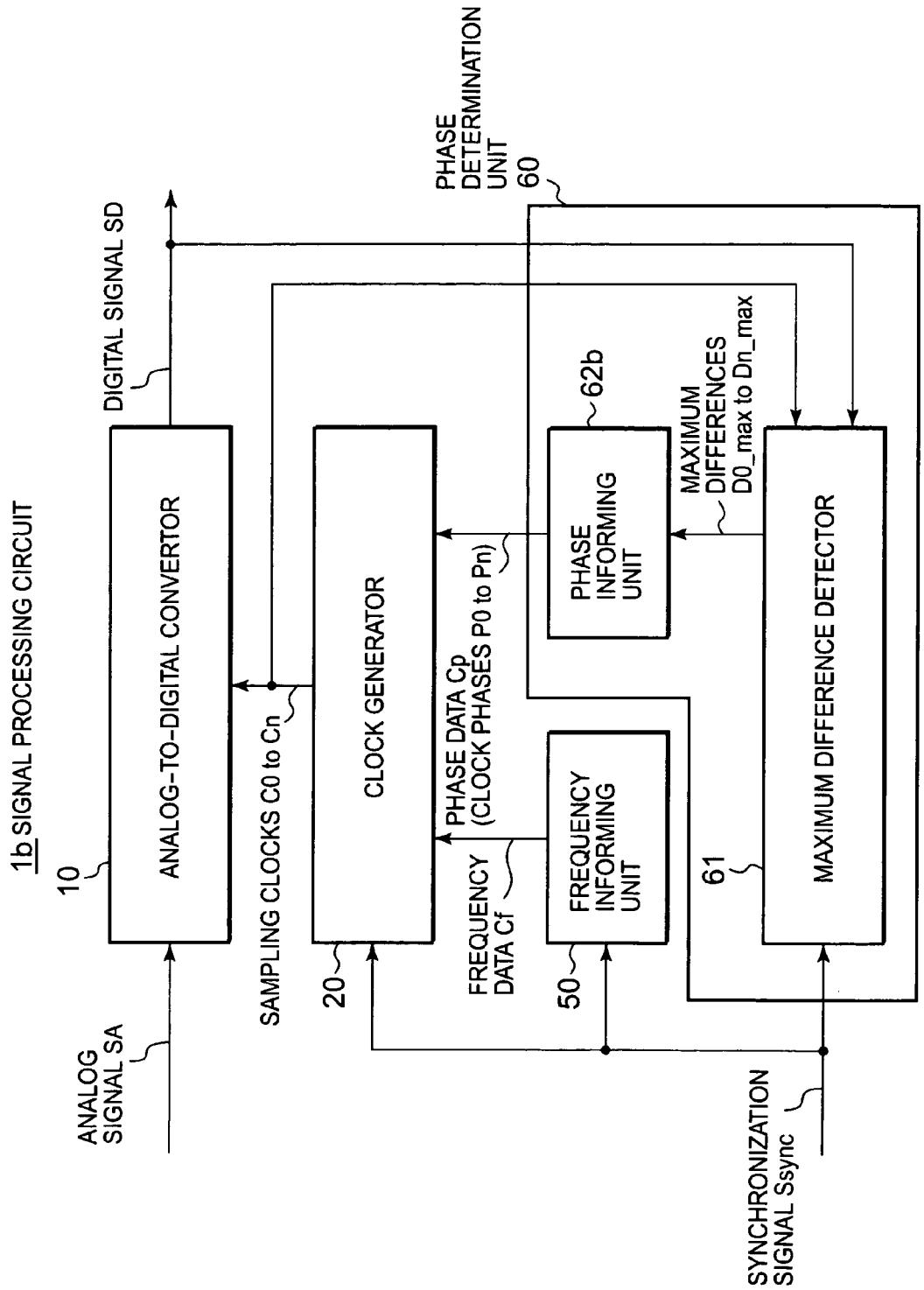

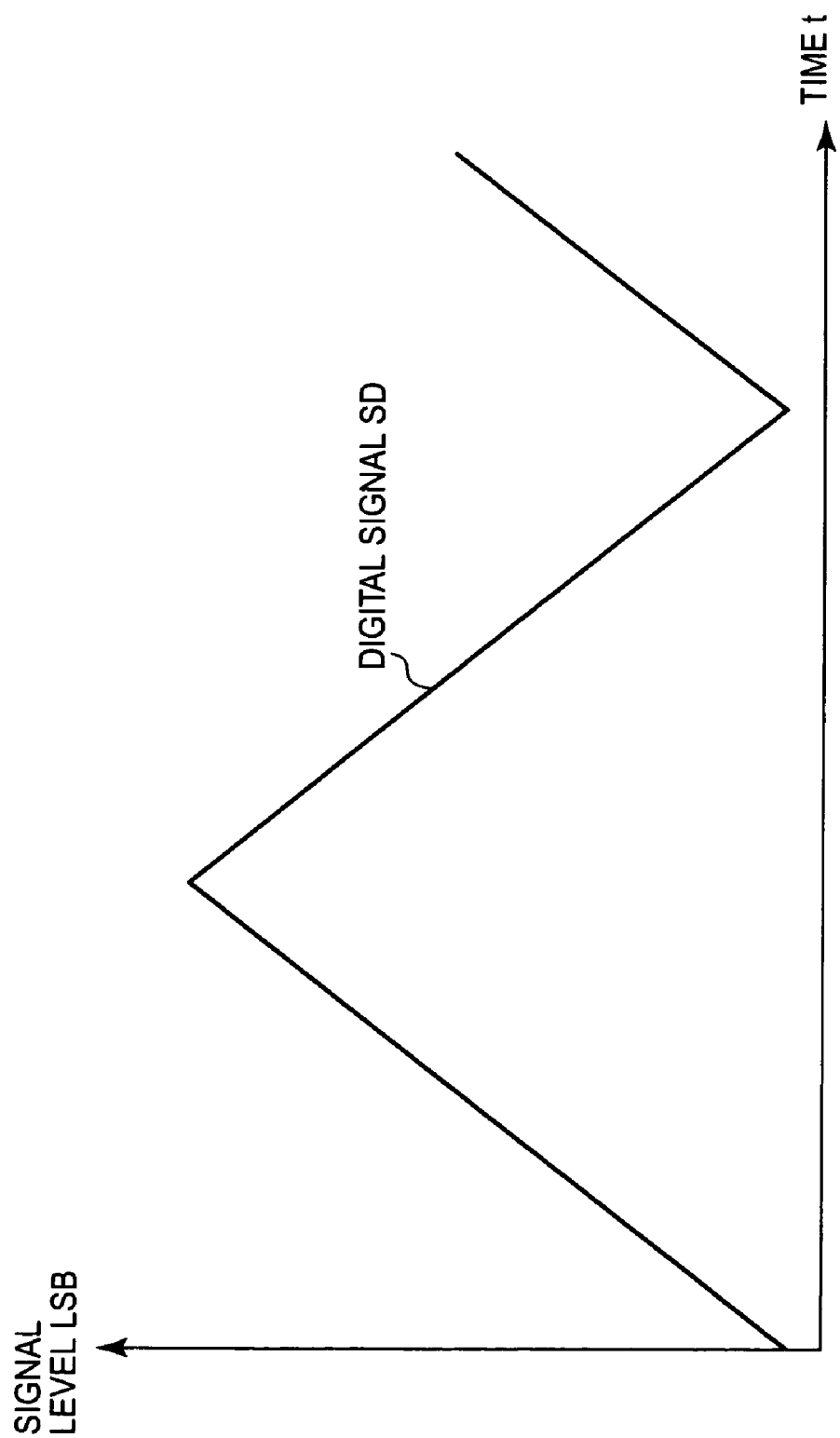

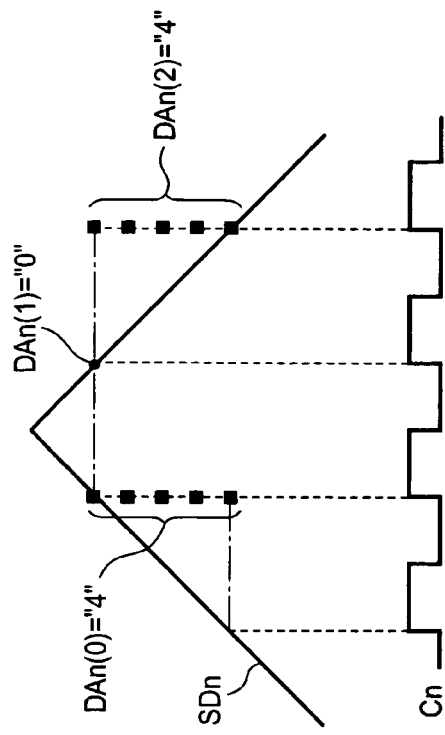
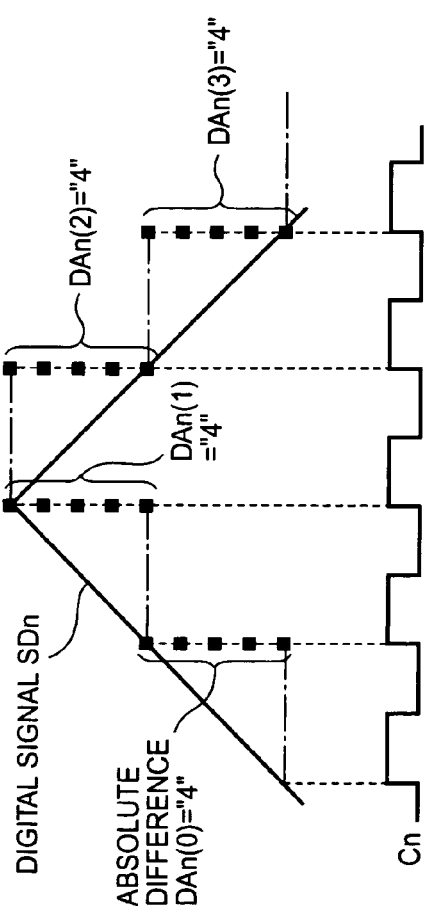
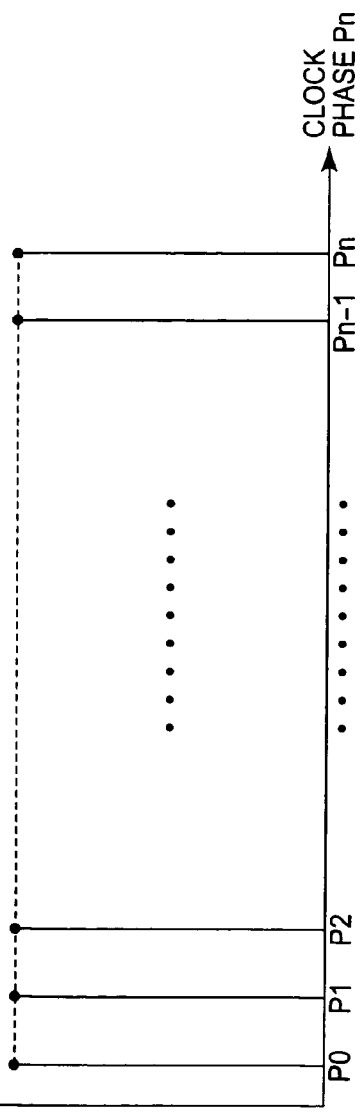

SIGNAL PROCESSING METHOD AND CIRCUIT TO CONVERT ANALOG SIGNAL TO DIGITAL SIGNAL

BACKGROUND OF THE INVENTION

1. Field of the Invention

The present invention relates to a signal processing method and a signal processing circuit, and particularly relates to a method and a circuit for automatically adjusting a phase of a sampling clock used when sampling an analog signal and converting the signal to a digital signal.

2. Description of Related Art

In a digital image display apparatus and the like, an analog-to-digital convertor samples (quantizes) RGB (Red-Green-Blue) signals being image data by use of a sampling clock, and thereby converts the signals to digital image signals. Here, generation of the sampling clock for the RGB signals is triggered by their synchronizing signals (a horizontal synchronizing signal and a vertical synchronizing signal). However, under the condition that the delays (input timings) of RGB signals and their synchronizing signals are not the same, the following problem has occurred. Specifically, sampling is not performed appropriately by use of a sampling clock generated in response to such synchronizing signals as triggers, and consequently a blurred image is obtained when the resultant digital image signals are displayed.

Descriptions will hereinafter be given of related techniques [1] and [2] for dealing with the problem.

Related Technique [1]: FIGS. 7 to 10

A signal processing circuit 1a shown in FIG. 7 includes: an analog-to-digital convertor 10 which samples an inputted analog signal SA to convert the signal to a digital signal SD; a clock generator 20 which sequentially generates sampling clocks C0 to Cn having different phases in response to a synchronizing signal Ssync of the analog signal SA as a trigger, and provides these sampling clocks to the convertor 10; a clock controller 30 which provides frequency data Cf and phase data Cp (phases P0 to Pn of the respective clocks C0 to Cn) for informing the generator 20 of the frequency and the phases of the sampling clocks; and an effective image area start/end point detector 40 which operates with the sampling clocks C0 to Cn and the synchronizing signal Ssync, detects a start point HcS and an end point HcE of the effective image area of the analog signal SA by comparing the signal level of the digital signal SD with a predetermined threshold value Th, and provides these points to the clock controller 30.

Here, when receiving the synchronizing signal Ssync, the clock controller 30 determines a frequency common to the sampling clocks C0 to Cn on the basis of previously held parameters (such as the number of output pixels of the digital signal SD) and outputs the frequency as the frequency data Cf. In addition, the clock controller 30 finally determines a phase suitable for sampling among the clock phases P0 to Pn on the basis of the effective image area start points HcS and end points HcE detected on the operational conditions with the respective sampling clocks C0 to Cn.

Furthermore, as shown in FIG. 8, the effective image area start point HcS is a point (timing) where the analog signal SA first enters the effective image area after the input of the synchronizing signal Ssync, and the end point HcE is a point where the analog signal SA has just gone away from the effective image area. Accordingly, these points HcS and HcE can be detected by monitoring the signal level of the digital signal SD.

Descriptions will hereinafter be given of the detailed operations of the above signal processing circuit 1a with reference to FIGS. 9 and 10.

Now, it is assumed that the analog signal SA shown in FIG. 9 is sampled by use of sampling clocks C0 to C7 (clocks being out of phase with each other by a time obtained by dividing a clock cycle by 8).

In this case, with regard to the sampling clocks C0 to C3, the signal level (unillustrated) of the digital signal SD outputted from the analog-to-digital convertor 10 exceeds a threshold value Th for the first time at the rising timing of the s-th pulse $PL_s$ from the first. Then, the signal level of the digital signal SD falls below the threshold value Th at the rising timings of the pulses subsequent to the e-th (e>s) pulse $PL_e$ from the first.

On the other hand, with regard to the sampling clocks C4 to C7, the signal level of the digital signal SD exceeds the threshold value Th for the first time at the rising timing of a pulse $PL_{s-1}$. Then, with regard to the sampling clock C4, the signal level of the digital signal SD falls below the threshold value Th at the rising timings of the pulses subsequent to the pulse $PL_e$, as in the sampling clocks C0 to C3. Meanwhile, with regard to the sampling clocks C5 to C7, the signal level of the digital signal SD falls below the threshold value Th at the rising timings of the pulses subsequent to a pulse $PL_{e-1}$.

Therefore, as shown in FIG. 10, the effective image area start/end point detector 40 sets the effective image area start point HcS to the pulse $PL_s$ for the sampling clocks C0 to C3 while setting the start point HcS to the pulse $PL_{s-1}$ for the sampling clocks C4 to C7. In addition, the effective image area start/end point detector 40 sets the effective image area end point HcE to the pulse PLe for the sampling clocks C0 to C4 while setting the end point HcE to the pulse $PL_{e-1}$ for the sampling clocks C5 to C7.

Upon receiving the start points HcS and the end points HcE, the clock controller 30 firstly calculates the difference between each pair of start and end points "HcE−HcS" (that is, the number of samples included in each digital signal SD). The point differences "HcE−HcS" thus obtained are not equal to one another. Specifically, the point difference in the sampling clock C4, shown in the shaded area in the drawing, is greater by "1" pulse than those in the other sampling clocks C0 to C3 and C5 to C7, namely, the number of samples for C4 are different from those for C0 to C3 and C5 to C7.

Hence, the clock controller 30 provides the clock generator 20 with the center phase of the sampling clocks C0 to C3 and C5 to C7, which are expected to have the correct point difference "HcE−HcS," that is, the phase P0 of the sampling clock C0, as the phase data Cp.

In this manner, the signal processing circuit 1a can automatically adjust the phase of a sampling clock used for the sampling of the analog signal SA (refer to Patent Document 1, for example).

However, such a signal processing circuit has a problem that an adjusted phase of a sampling clock varies depending on the set value of the threshold value Th.

For example, assume that the analog signal SA shown in FIG. 11 is inputted. In this case, the results of adjusting the phase of a sampling clock are different between when using a threshold value Tha and when using a threshold value Thb which is set smaller than the threshold value Tha.

In other words, even though the same analog signal SA is sampled by use of the sampling clocks C0 to C7 respectively having the same phases in both the cases where the threshold values Tha and Thb are used, the clock controller 30 selects different phases in these cases as shown in FIG. 12. Specifically, the clock controller 30 selects the phase P1 (the center phase of the sampling clocks C0 to C3 and C7, which are expected to have the correct point difference "HcE−HcS") of the sampling clock C1 when the threshold value Tha is used while selecting the phase P7 (the center phase of the sampling clocks C0 to C2 and C4 to C7, which are expected to have the correct point difference "HcE−HcS") of the sampling clock C7 when the threshold value Thb is used.

To deal with the problem, the related technique [2] has been proposed as follows.

Related Technique [2]: FIGS. 13 to 17

A signal processing circuit 1b shown in FIG. 13 includes a frequency informing unit 50 and a phase determination unit 60 instead of the clock controller 30 and the effective image area start/end point detector 40, which are shown in FIG. 7.

Here, the frequency informing unit 50 determines a frequency common to the sampling clocks C0 to Cn on the basis of parameters previously held when receiving the synchronizing signal Ssync, and outputs the frequency as the frequency data Cf, similarly to the clock controller 30.

Furthermore, the phase determination unit 60 has: a maximum difference detector 61 which detects maximum values D0_max to Dn_max (hereinafter, referred to as the maximum differences, and may be collectively called a symbol D_max) of absolute differences between each adjacent two signal levels in each digital signal SD sequentially sampled by the sampling clocks C0 to Cn; and a phase informing unit 62b which provides the clock generator 20 with the phase of the sampling clock, from which the maximum value has been obtained, among these maximum differences D0_max to Dn_max, as the phase data Cp.

With regard to the operations, first, the phase informing unit 62b sequentially provides the clock generator 20 with the clock phases P0 to P7 first, and generates the sampling clocks C0 to C7, similarly to the clock controller 30 shown in FIG. 7.

The analog-to-digital convertor 10 operates with the sampling clocks C0, C1, . . . , C4, . . . , and C7 as shown in FIG. 14, sequentially converts the analog signal SA to digital signals SD0_1, SD0_2, . . . (hereinafter, they may collectively be called the symbol SD0), SD1_1, SD1_2, . . . (hereinafter, they may collectively be called the symbol SD1), . . . , SD4_1, SD4_2, . . . (hereinafter, they may collectively be called the symbol SD4), . . . , and SD7_1, SD7_2, . . . (hereinafter, they maybe collectively called the symbol SD7), and provides the signals to the maximum difference detector 61.

Here, an optimum phase of the sampling clock is one which can capture the peak value of the analog signal SA. Therefore, the absolute difference between adjacent signal levels in the digital signal SD becomes larger as sampled by a sampling clock with a more appropriate phase. Hence, the maximum difference detector 61 detects absolute differences for all the signal levels of the digital signals SD0 to SD7.

In other words, as shown in FIG. 15, first, the maximum difference detector 61 detects a difference obtained by the sampling clock C0 between the signal levels of the digital signals SD0_1 and SD0_2, which are adjacent to each other, and detects the absolute difference DA0. Similarly, the maximum difference detector 61 detects the absolute differences DA1 to DA7 of the digital signals SD1 to SD7 obtained respectively by use of the sampling clocks C1 to C7. The maximum difference detector 61 executes the process for all the signal levels of the digital signals SD0 to SD7.

In other words, as shown in FIG. 16, the maximum difference detector 61 detects absolute differences DAn(i), Dan(i+1), DAn(i+2), . . . (i is a natural number) for the whole analog signal SA. The maximum difference detector 61 then provides the phase informing unit 62b with the largest DAn(i) among the illustrated absolute differences DAn(i) to DAn(i+2), for example, as the maximum difference Dn_max.

Assuming that D0_max is now the largest among the absolute differences D0_max to D7_max as shown in FIG. 17, the phase informing unit 62b provides the clock generator 20 with the phase P0 of the sampling clock C0, from which the maximum difference D0_max has been obtained, as the phase data Cp (Step T1).

Consequently, the signal processing circuit 1b can adjust the phase of a sampling clock used for the sampling of the analog signal SA with higher accuracy than the above related technique [1] (the signal processing circuit 1a shown in FIG. 7) (refer to Patent Documents 2 to 4, for example).

[Patent Document 1] Japanese Patent Application Publication No. 2000-47649
[Patent Document 2] Japanese Patent Application Publication No. 2000-89709
[Patent Document 3] Japanese Patent Application Publication No. 2001-356729
[Patent Document 4] Japanese Patent Application Publication No. 2004-144842

SUMMARY

The above related technique [2] has a problem that although the accuracy of adjusting a sampling clock is increased by selecting a phase with which a maximum value is obtained among maximum differences, the accuracy of the adjustment depends on the waveform of a digital signal, that is, an analog signal before conversion.

For example, when a maximum difference is obtained from the digital signal SD whose signal levels repeat a monotonic increase and a monotonic decrease as shown in FIG. 18, the phase adjustment of a sampling clock is difficult to make as in the following.

Here, in order to simplify the descriptions, considered is a case where a monotonic increase and a monotonic decrease, which have a slope where a difference of values between each adjacent two pixels, which are one clock apart from each other in a sampling clock, is "4." As shown in FIG. 19a, when the sampling clock Cn has an optimum phase to capture the peak value of the digital signal SD, the absolute differences DA(0) to DA(1) are all "4," and the absolute difference is "4." However, as shown in FIG. 19b, even when the sampling clock Cn has the most inappropriate phase which crosses the peak value of the digital signal SD, the maximum difference is "4."

This is the case also when the sampling clock Cn has a different phase, and the maximum differences Dn_max take the same values for all the clock phases P0 to Pn as shown in FIG. 19c.

Therefore, it is not possible to obtain any information for adjusting a phase since maximum values of the maximum differences Dn_max do not change even when the phase of a sampling clock is caused to change. In other words, in this case, how the phase of a sampling clock is adjusted is indeterminate.

A signal processing method according to an exemplary aspect of the present invention includes, a signal conversion step of sampling an analog signal and converting the analog signal to a digital signal, and a phase determination step of executing the signal conversion step by synchronizing the signal with sampling clocks with different phases and obtaining differences between each adjacent two signal levels in each sampled digital signal, as well as of monitoring a polarity change in the differences, extracting a more inappropriate phase used for sampling among the phases of the sampling clocks on the basis of absolute values of the differences where the polarity change has been detected, and determining an antiphase of the extracted phase as a phase of a sampling clock to execute the signal conversion step.

In addition, a signal processing circuit according to an exemplary aspect of the present invention includes: a signal convertor which samples an analog signal and converts the signal to a digital signal; and a phase determination unit which obtains differences between each adjacent two signal levels in each sampled digital signal by sequentially providing the signal convertor with sampling clocks with different phases, as well as monitors a polarity change in the differences, extracts a more inappropriate phase used for sampling among phases of the sampling clocks on the basis of absolute values of the differences where the polarity change has been detected, and determines an antiphase of the extracted phase as a phase of a sampling clock to be provided to the signal convertor.

In other words, the present invention can extract a more inappropriate phase used for sampling and determine an antiphase (e.g. a reverse or opposite phase) of the phase as an appropriate phase of a sampling clock, by focusing on a characteristic that the more inappropriate a phase of a sampling clock is, the smaller an absolute difference upon a polarity change becomes, or equivalently, focusing on the fact that values which at least are not the same can be obtained in response to a phase change, even when a digital signal has a waveform shown in FIG. 18

The present invention can adjust a phase of a sampling clock more securely and more accurately than the above related technique [2] without depending on a signal waveform. Therefore, it is possible to improve a signal quality (a display quality in a digital image display, for example) in various apparatuses to apply the present invention to.

BRIEF DESCRIPTION OF THE DRAWINGS

The above and other exemplary aspects, advantages and features of the present invention will be more apparent from the following description of certain exemplary embodiments taken in conjunction with the accompanying drawings, in which:

FIG. 4 is a view showing an operational example of a phase informing unit used in the first exemplary embodiment of the signal processing circuit according to the present invention;

FIG. 10 is a view showing a phase adjustment operation example of a sampling clock in the signal processing circuit according to the related technique [1] of the present invention;

FIG. 11 is a view showing a threshold setting example for explaining problems of the signal processing circuit according to the related technique [1] of the present invention;

FIG. 12 is a view showing a phase adjustment operation example of the sampling clock for explaining problems of the signal processing circuit according to the related technique [1] of the present invention;

FIG. 13 is a block diagram showing a configuration example of a signal processing circuit according to a related technique [2] of the present invention;

FIG. 18 is a time chart showing a waveform example of a digital signal; and

FIG. 19 is a view for explaining problems of the signal processing circuit according to the related technique [2] of the present invention.

DETAILED DESCRIPTION OF THE EXEMPLARY EMBODIMENTS

Configuration Example Common to each Exemplary Embodiment

FIG. 1

Figure 1:
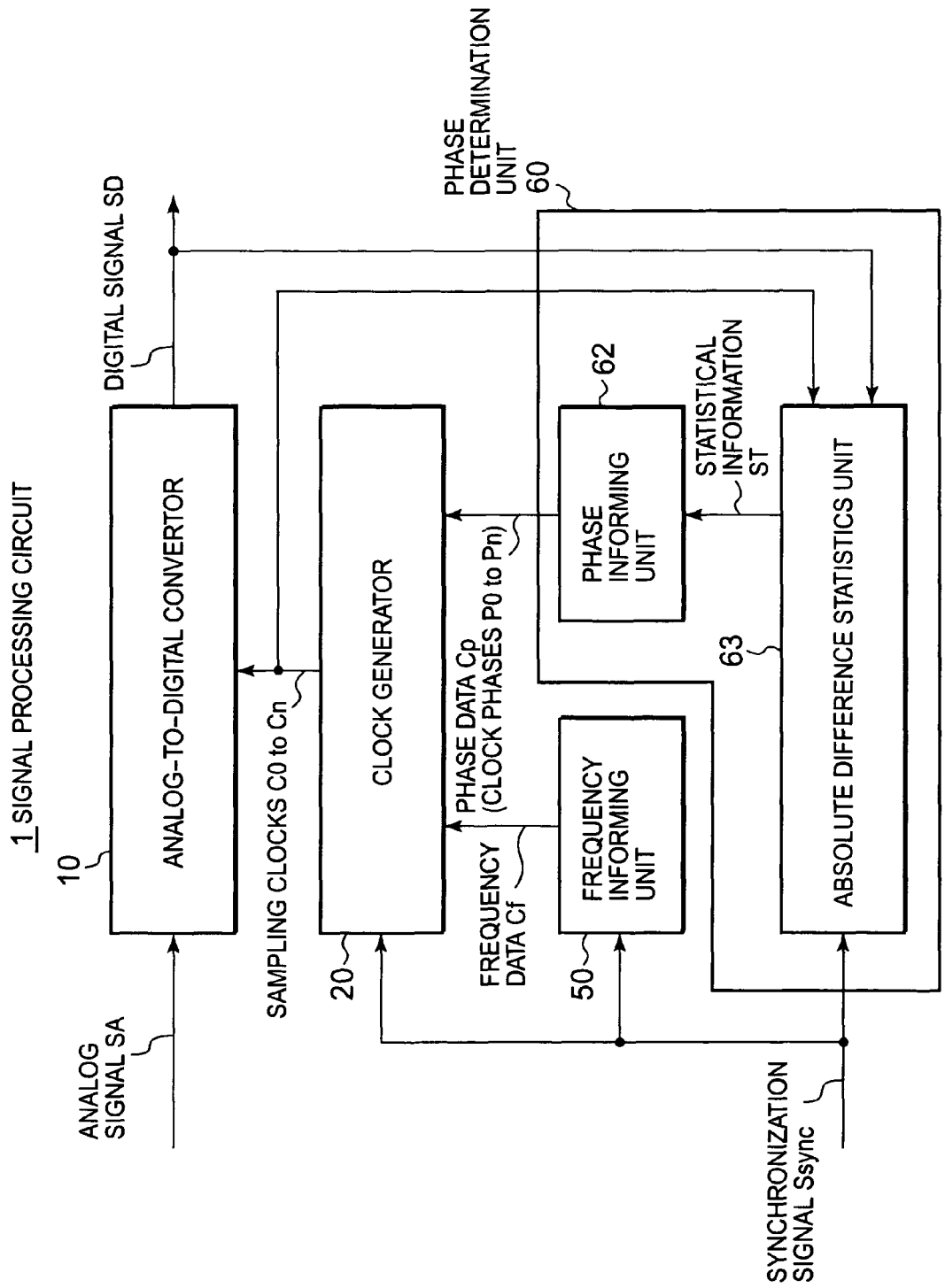
FIG. 1 is a block diagram showing a configuration example common to first to third exemplary embodiments of a signal processing circuit according to the present invention.

FIG. 1 shows a configuration example of a signal processing circuit common to the first to third exemplary embodiments according to the present invention. Different points in the signal processing circuit 1 from the above related technique [2] are that the phase determination unit 60 has: an absolute difference statistics unit 63 which performs statistics on absolute differences upon a polarity change; and a phase informing unit 62 which generate the phase data Cp on the basis of statistical information ST outputted from the statistics unit 63, instead of the maximum difference detector 61 and the phase informing unit 62b shown in FIG. 13.

First Exemplary Embodiment

Figure 2:
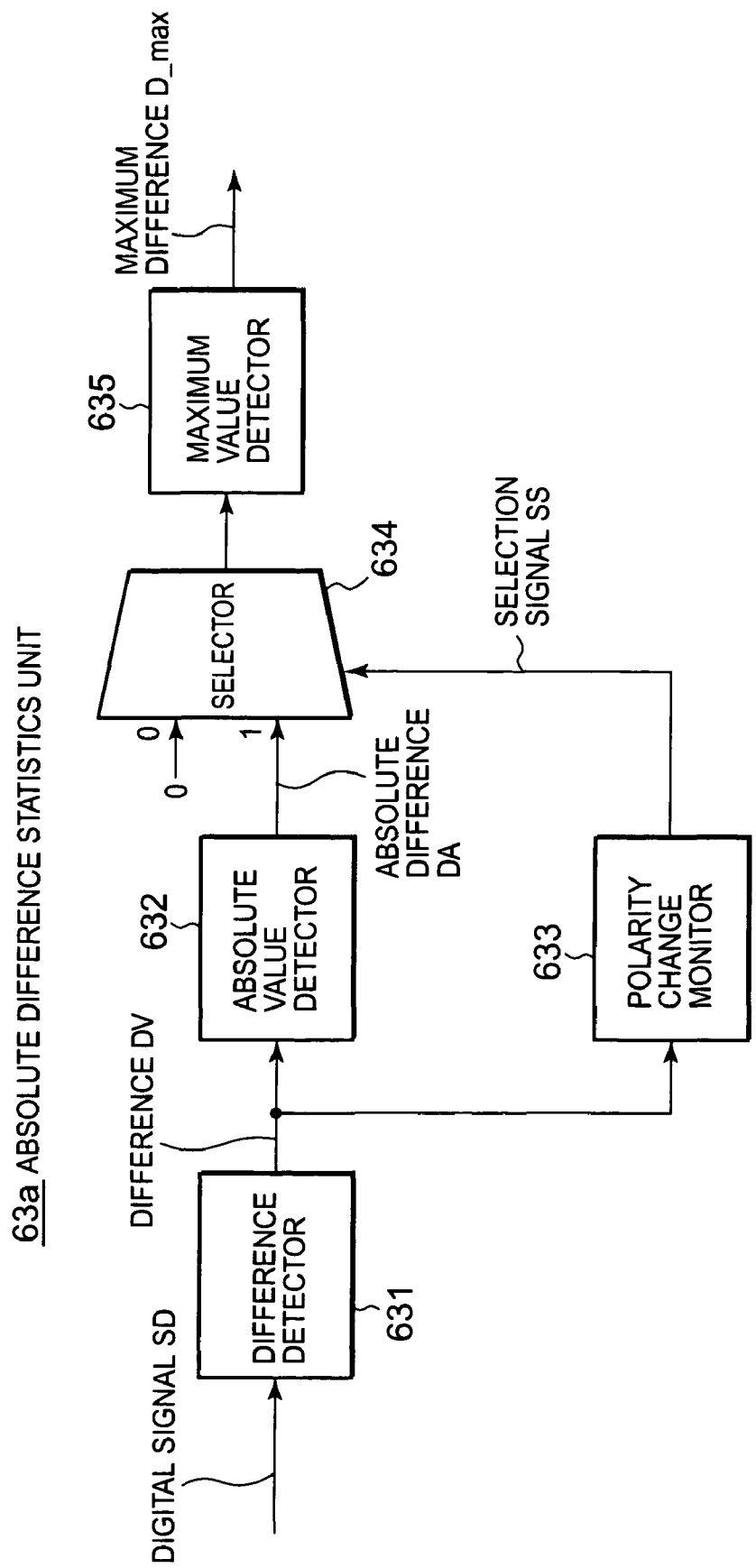
FIG. 2 is a block diagram showing a configuration example of an absolute difference statistics unit used in the first exemplary embodiment of the signal processing circuit according to the present invention.

FIGS. 2 to 4

As shown in FIG. 2, a maximum difference statistics unit 63a used in this exemplary embodiment has: a difference detector 631 which detects differences DV between each adjacent two signal levels in each digital signal SD sequentially sampled by sampling clocks C0 to Cn; an absolute value detector 632 which detects absolute values DA of the differences DV; a polarity change monitor 633 which monitors a polarity change in the differences DV and generates a selection signal SS ("1" or "0"); a selector 634 which selects, in accordance with the selection signal SS, either the absolute difference DA inputted from the absolute value detector 632 or "0" always inputted; and a maximum value detector 635 which detects a maximum value D_max of an output from the selector 634 and provides the phase informing unit 62 with the maximum value as the statistical information ST shown in FIG. 1.

In other words, only when detecting the polarity change in the absolute difference DA, the polarity change monitor 633 provides the selector 634 with a selection signal SS="1" and targets the absolute difference DA for the maximum value detection. On the other hand, when not detecting the polarity change in the absolute difference DA, the polarity change monitor 633 provides the selector 634 with a selection signal SS="0" and does not target (discards) the absolute difference DA for the maximum value detection.

It is assumed that the analog-to-digital convertor (converter) 10 samples the analog signal SA with the sampling clocks C0 to C31 (clocks being out of phase with each other by a time obtained by dividing a clock cycle by 32) and converts the analog signal to the digital signals SD whose signal levels repeat a monotonic increase and a monotonic decrease as shown in FIG. 18. In addition, it is assumed that a phase P16 of the sampling clock C16 crosses the peak value of the digital signal SD is the most inappropriate as shown in FIG. 3b.

Figure 3A:
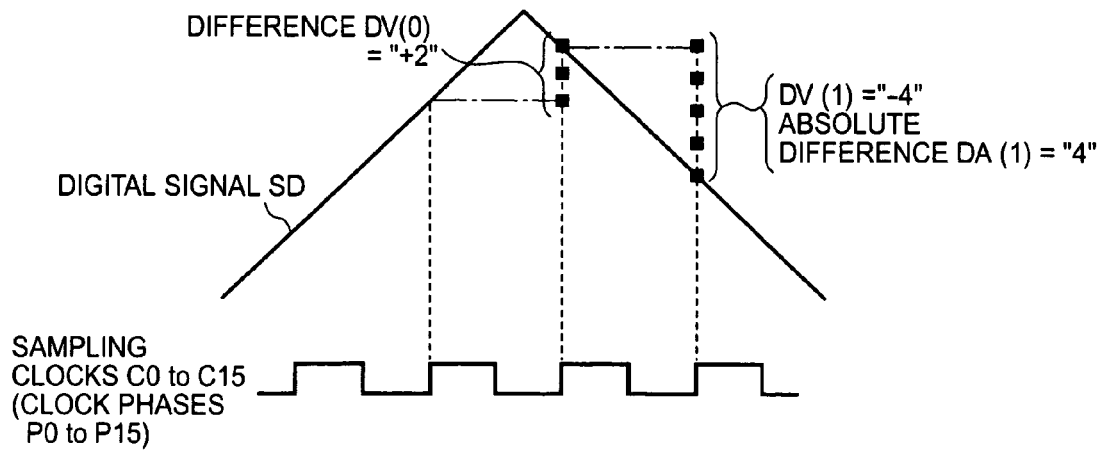
FIG. 3 is a time chart showing an operational example of the absolute difference statistics unit used in the first exemplary embodiment of the signal processing circuit according to the present invention.

In this case, the difference detector 631 composing the maximum difference statistics unit 63a sequentially detects differences DV(0)="+2" and DV(1)="−4" for the sampling clocks C0 to C15 as shown in FIG. 3a, for example. Although a value is "+2" in a case of DV(0) in FIG. 3a, a value of 0<DV(0)≦+4 is taken. Note that a case where the slopes of an increase and a decrease of a signal level for a cycle of the sampling clock are "+4" and "−4" respectively is handled as shown in the drawing in this example in order to make the descriptions easier to understand.

At this point, the polarity change monitor 633 detects that the difference DV has changed the polarity from "+" to "−," and provides the selector 634 with the selection signal SS="1." Consequently, the maximum value detector 635 is provided with the absolute difference DA(1)="4" outputted from the absolute value detector 632.

Figure 3B:
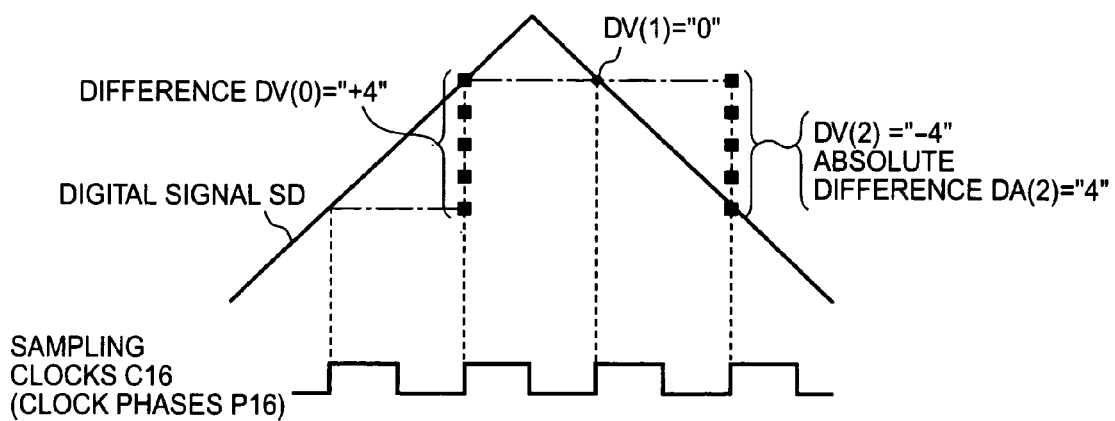

Moreover, the difference detector 631 sequentially detects the differences DV(0)="+4," DV(1)="0" and DV(2)="−4" as shown in FIG. 3b for the sampling clock C16. When receiving the difference DV(2), the polarity change monitor 633 detects that the difference DV has changed the polarity from "+" to "−." As a result, the maximum value detector 635 is provided with the absolute difference DA(2)="4" outputted from the absolute value detector 632.

Therefore, as shown in FIG. 4, the maximum differences D0_max to D16_max corresponding to the clock phases P0 to P16 detected by the maximum value detector 635 take the same value.

Figure 3C:
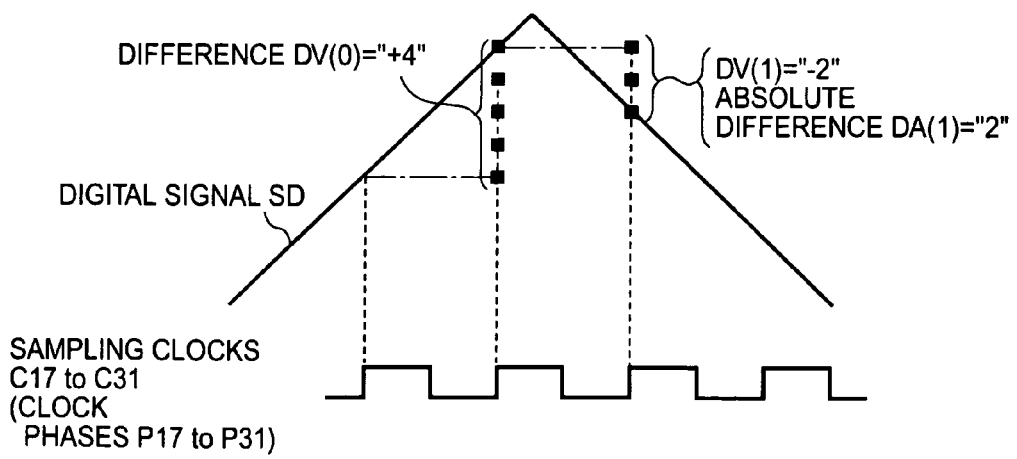

On the other hand, the difference detector 631 sequentially detects the differences DV(0)="+4" and DV(1)="−2" for the sampling clocks C17 to C31 as shown in FIG. 3c, for example. When receiving the difference DV(1), the polarity change monitor 633 detects that the difference DV has changed the polarity from "+" to "−," and the maximum value detector 635 is provided with the absolute difference DA(1)="2." A value of −4<DV(1)<0 is taken although it is set to be "−2" in FIG. 3c in the case of DV(1). Hence, DA(1) takes a value of 0<DA(1)<+4.

Therefore, as shown in FIG. 4, the maximum differences D17_max to D31_max corresponding to the clock phases P17 to P31 have different values from D0_max to D16_max. Furthermore, as shown in the drawing, the maximum differences D17_max to D31_max have a characteristic of increasing as the clock phase shifts with D17_max and D31_max respectively set to the minimum and the maximum values.

The phase informing unit 62, which has received the maximum differences D17_max to D31_max from the maximum difference detector 635, extracts the clock phase P17 corresponding to the minimum value D17_max among the maximum differences D17_max to D31_max as an inappropriate phase (Step S1 in FIG. 4) as well as determines an antiphase of the clock phase P17 as an appropriate phase of the sampling clock (Step S2).

In this manner, the signal processing circuit 1 can automatically adjust a phase of a sampling clock used for the sampling of the analog signal SA without depending on the waveform of the digital signal SD.

Second Exemplary Embodiment

FIG. 5

Figure 5:
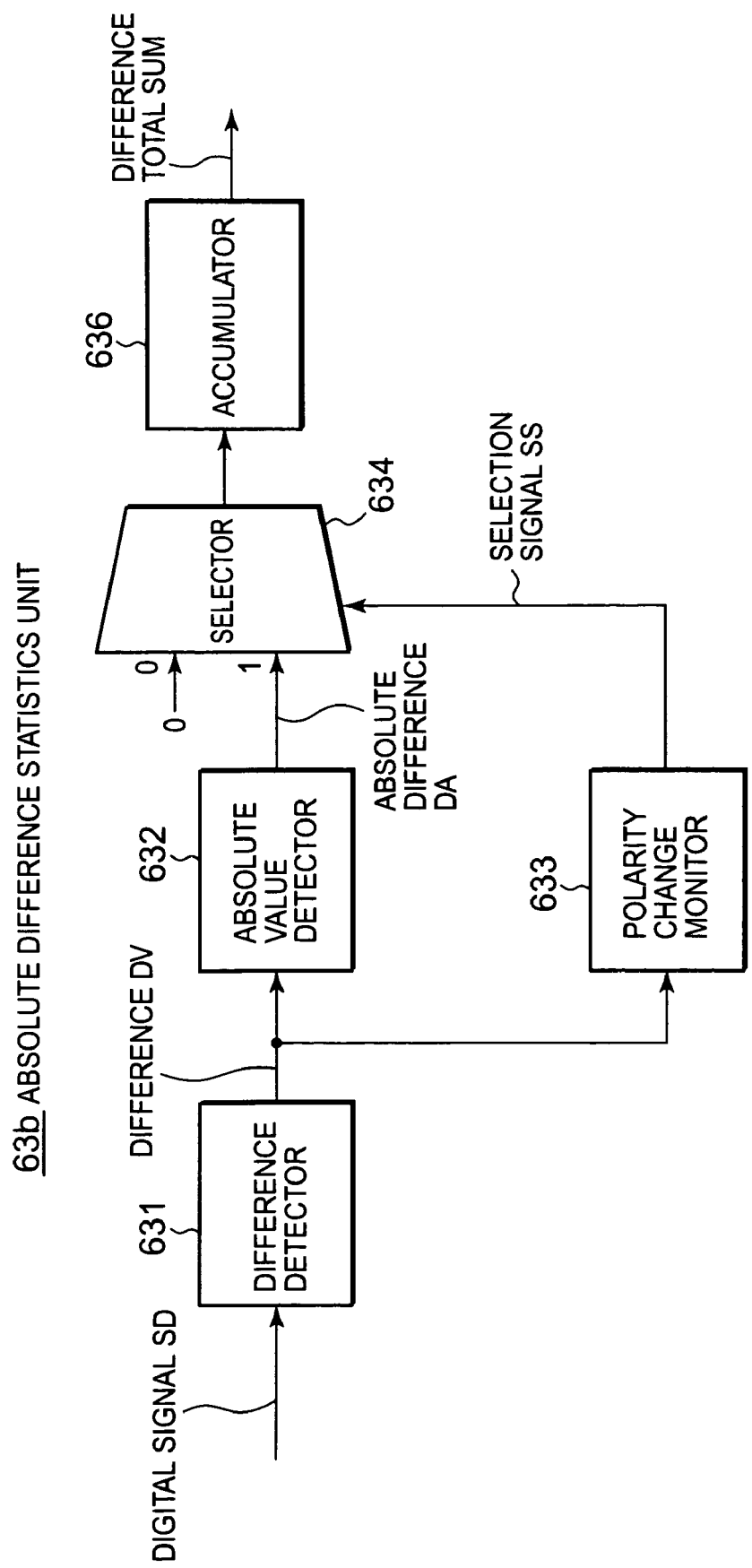
FIG. 5 is a block diagram showing a configuration example of an absolute difference statistics unit used in the second exemplary embodiment of the signal processing circuit according to the present invention.

A maximum difference statistics unit 63b shown in FIG. 5 and used in this exemplary embodiment is different from the maximum difference statistics unit 63a in the above first exemplary embodiment in that, instead of the maximum value detector 635 shown in FIG. 2, an accumulator 636 is provided which adds up the absolute differences DA where the polarity change has been detected, which finds the total sum (hereinafter, referred to as the difference total sum) SUM and which provides the phase informing unit 62 with the sum as the statistical information ST shown in FIG. 1.

With regard to the operations, the accumulator 636 provides the phase informing unit 62 with difference total sums SUM0 to SUMn found by sequentially adding up the absolute differences DA for the sampling clocks C0 to Cn. The phase informing unit 62 extracts a clock phase corresponding to a minimum value among the difference total sums SUM0 to SUMn as an inappropriate phase, as well as determines an antiphase of the extracted phase as an appropriate phase of the sampling clock, similarly to Step S2 shown in FIG. 4.

Also in this case, the signal processing circuit 1 can automatically adjust a phase of a sampling clock without depending on the waveform of the digital signal SD, similarly to the above first exemplary embodiment.

Moreover, since the difference total sum SUM is used, it is possible to more comprehensively extract an inappropriate clock phase the above first exemplary embodiment, or equivalently, to extract a phase of the sampling clock, from which a larger number of small absolute differences upon a polarity change can be obtained over the digital signal SD. Additionally, there is an advantage of being capable of reducing effects of noises and the like included in the digital signal SD.

Third Exemplary Embodiment

FIG. 6

Figure 6:
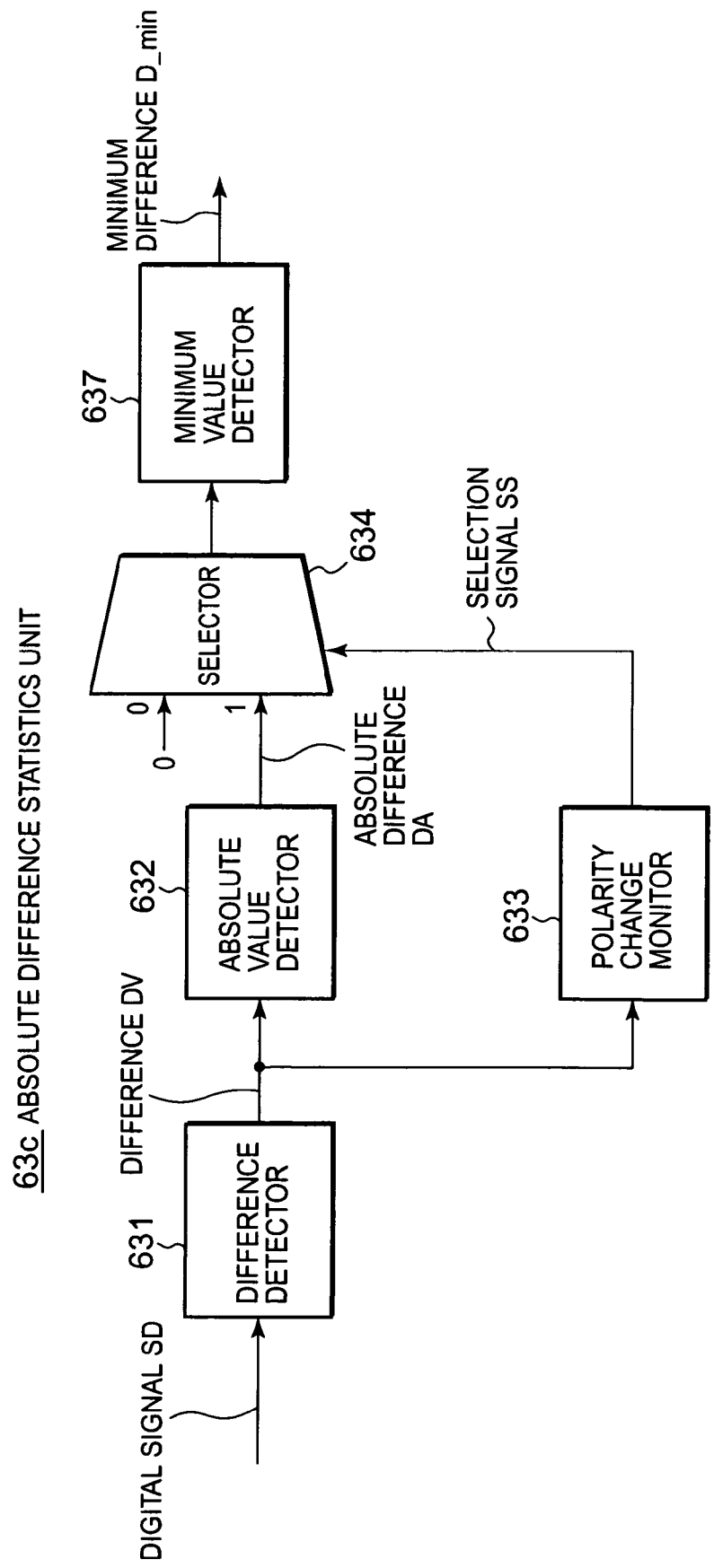
FIG. 6 is a block diagram showing a configuration example of an absolute difference statistics unit used in the third exemplary embodiment of the signal processing circuit according to the present invention.
Figure 7:
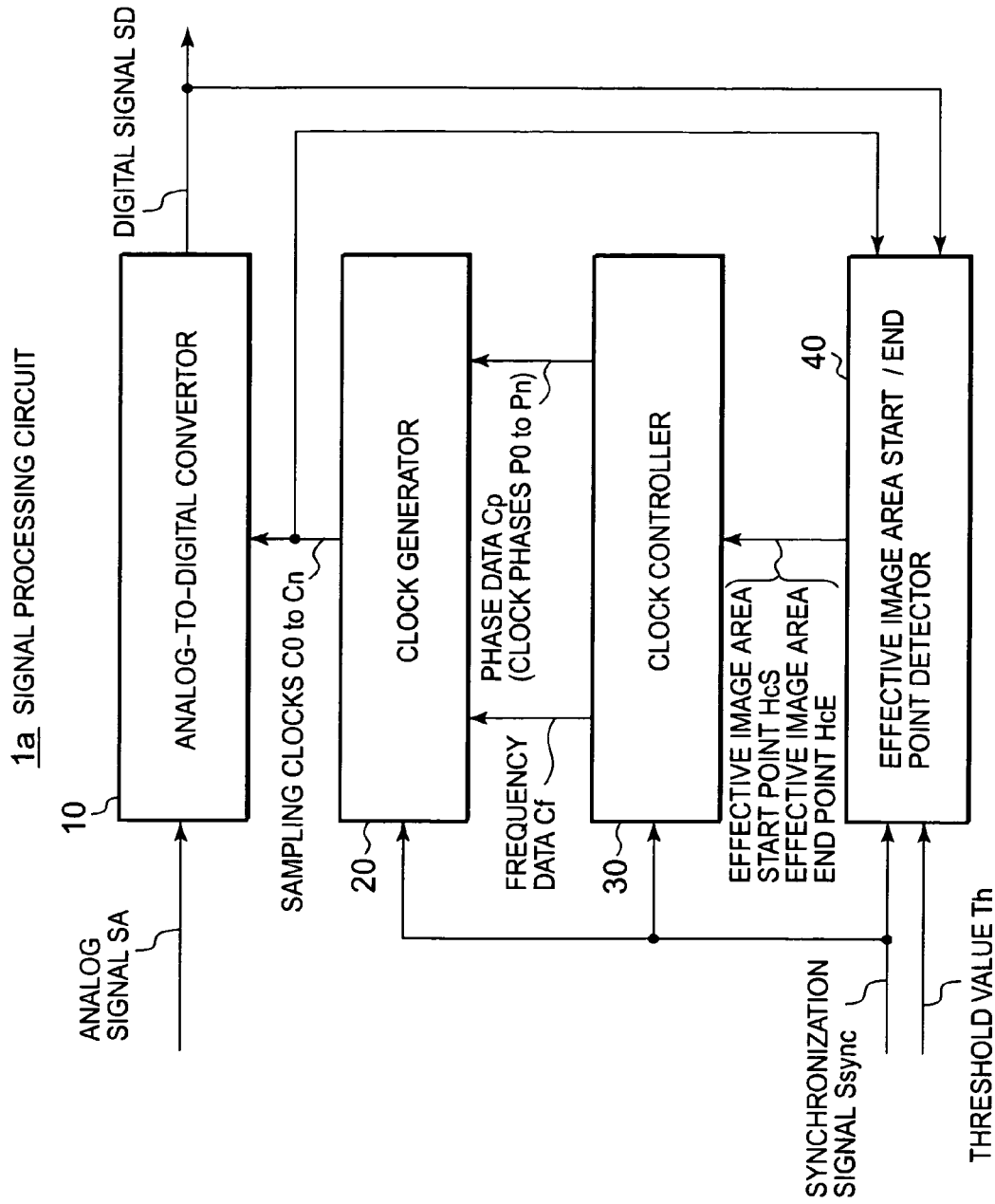
FIG. 7 is a block diagram showing a configuration example of a signal processing circuit according to a related technique [1] of the present invention.
Figure 8:
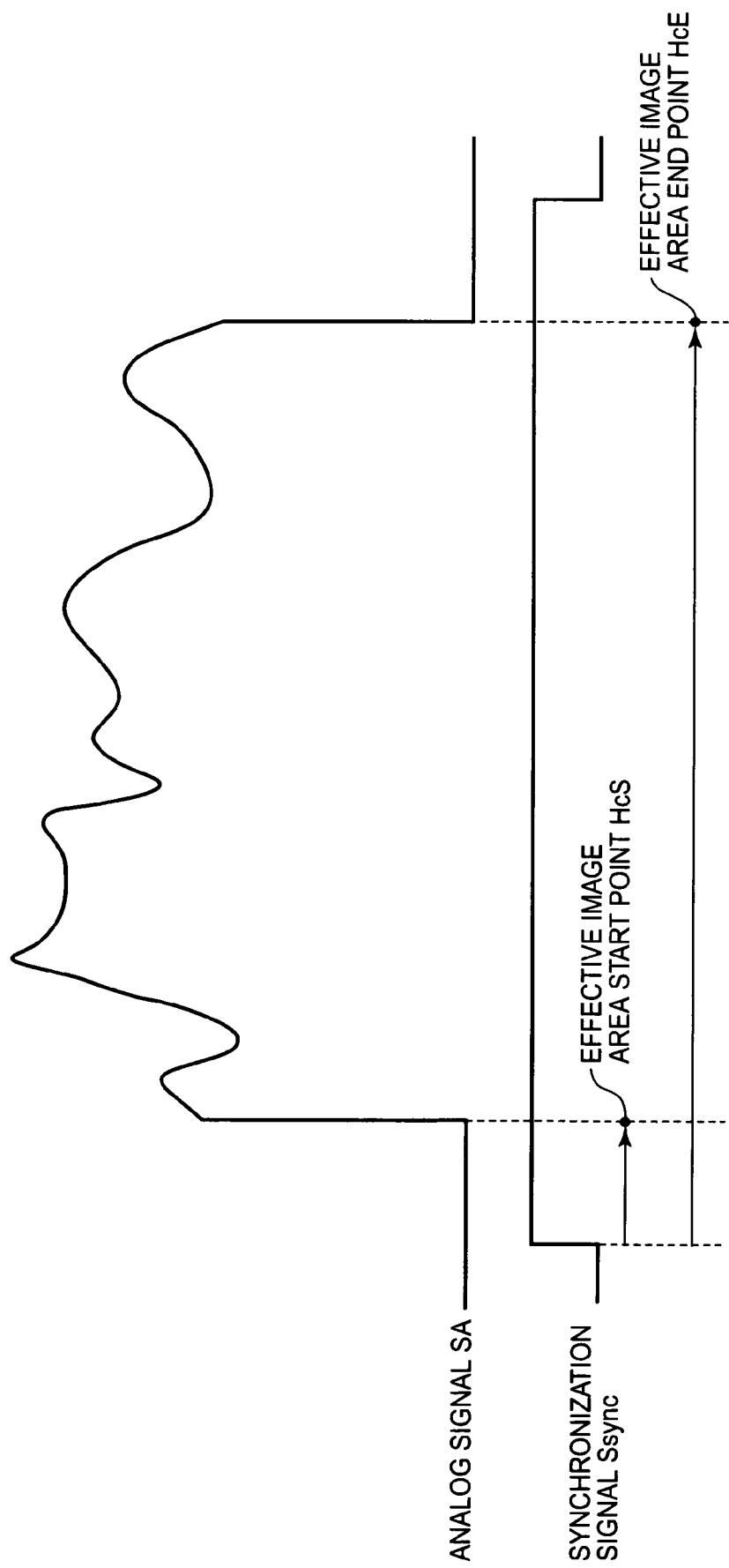
FIG. 8 is a time chart for explaining a start and an end point of an effective image area of an analog signal.
Figure 9:
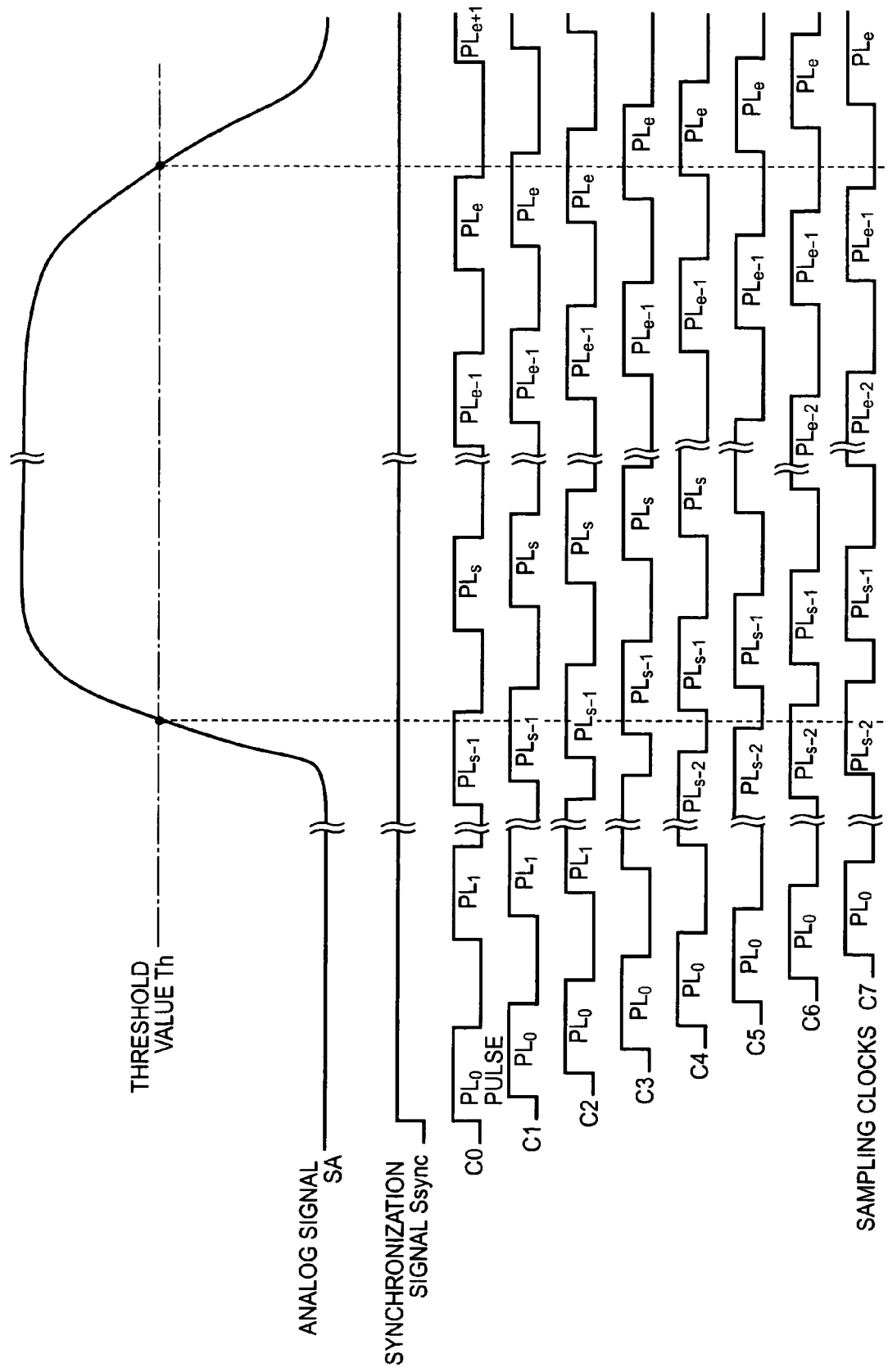
FIG. 9 is a time chart showing a detection operation example of the start and end points of the analog signal in the signal processing circuit according to the related technique [1] of the present invention.
Figure 14:
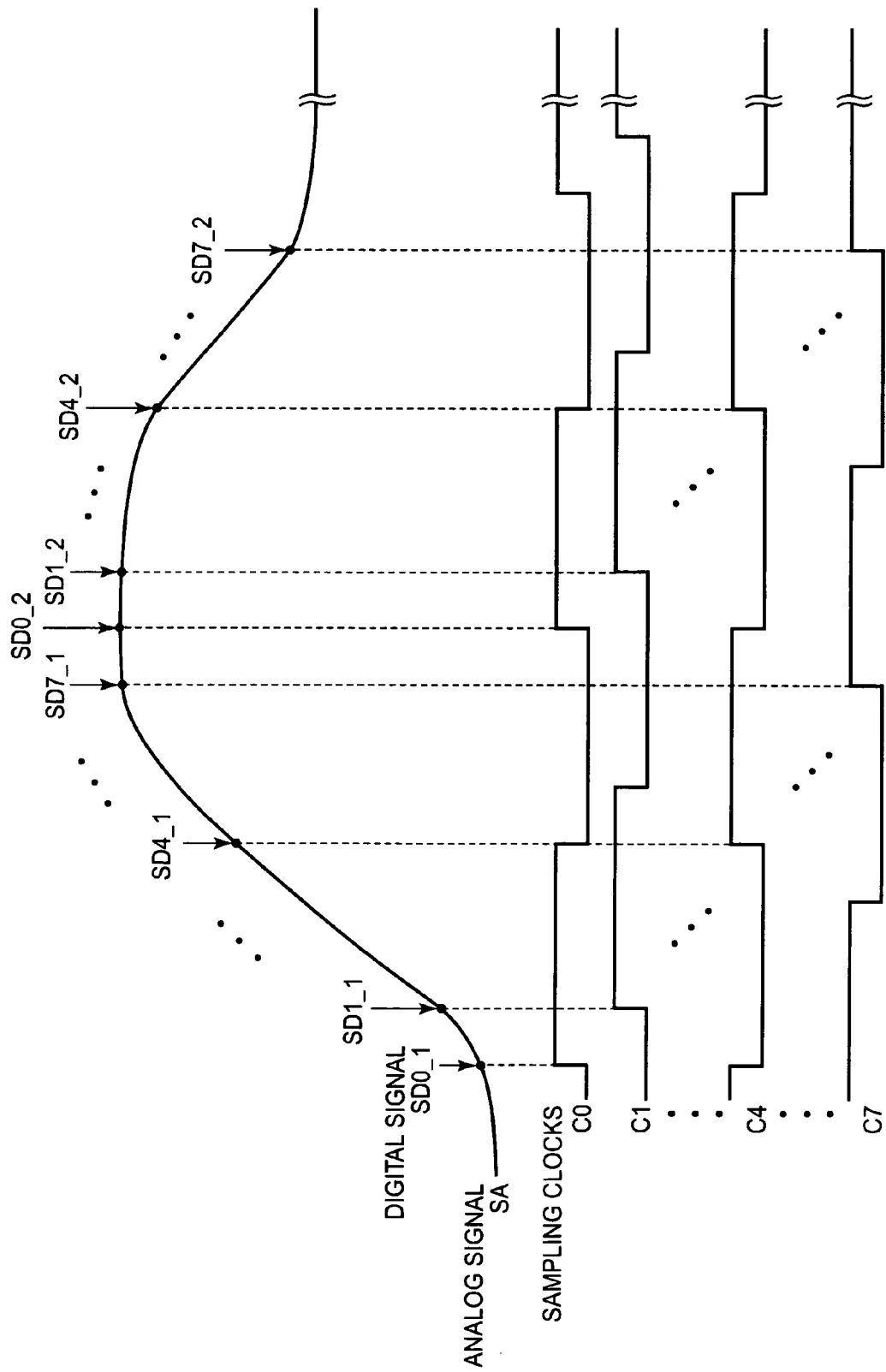
FIG. 14 is a time chart showing a sampling operation example of an analog signal in the signal processing circuit according to the related technique [2] of the present invention.
Figure 15:
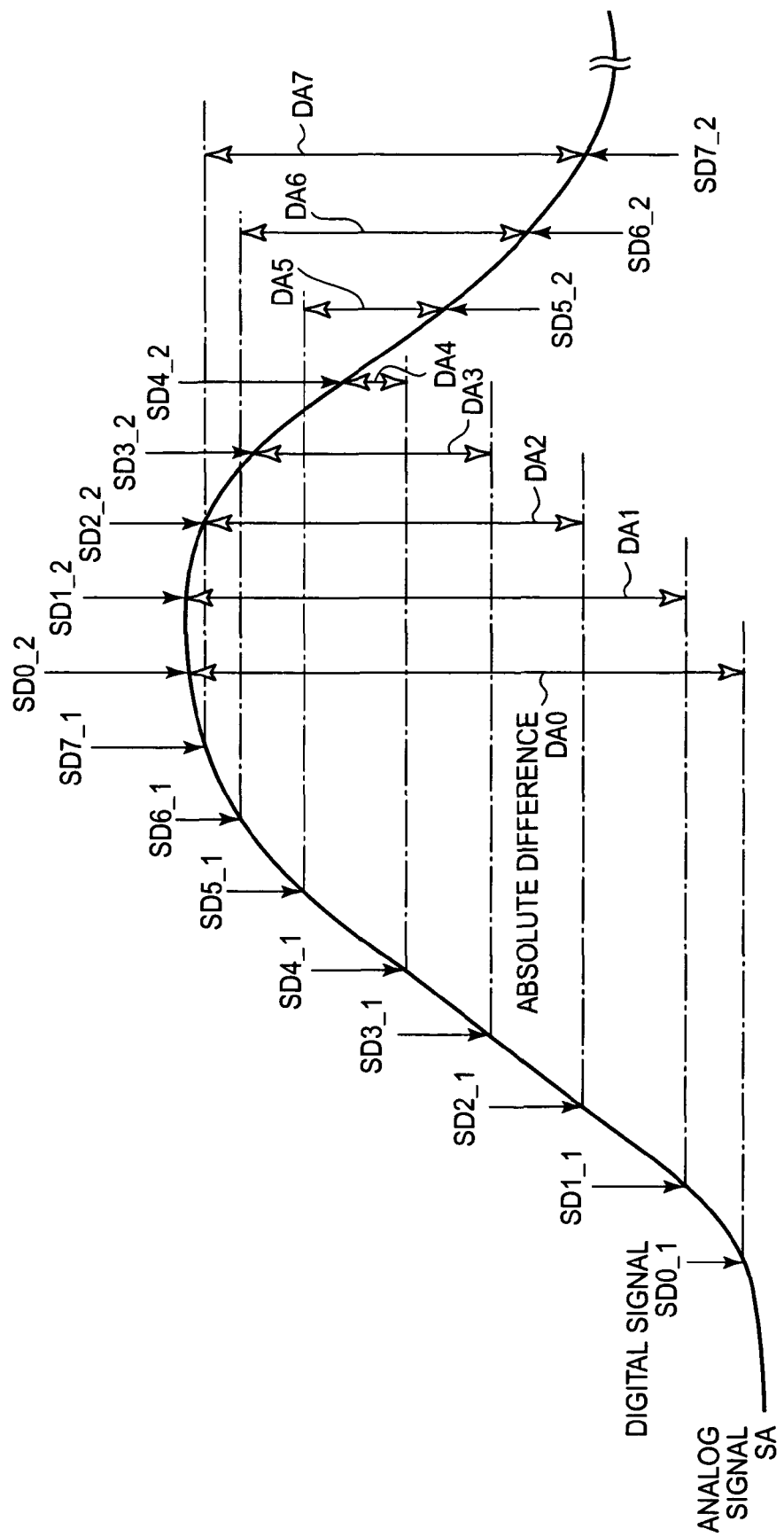
FIG. 15 is a view showing a detection operation example of an absolute difference in the signal processing circuit according to the related technique [2] of the present invention.
Figure 16:
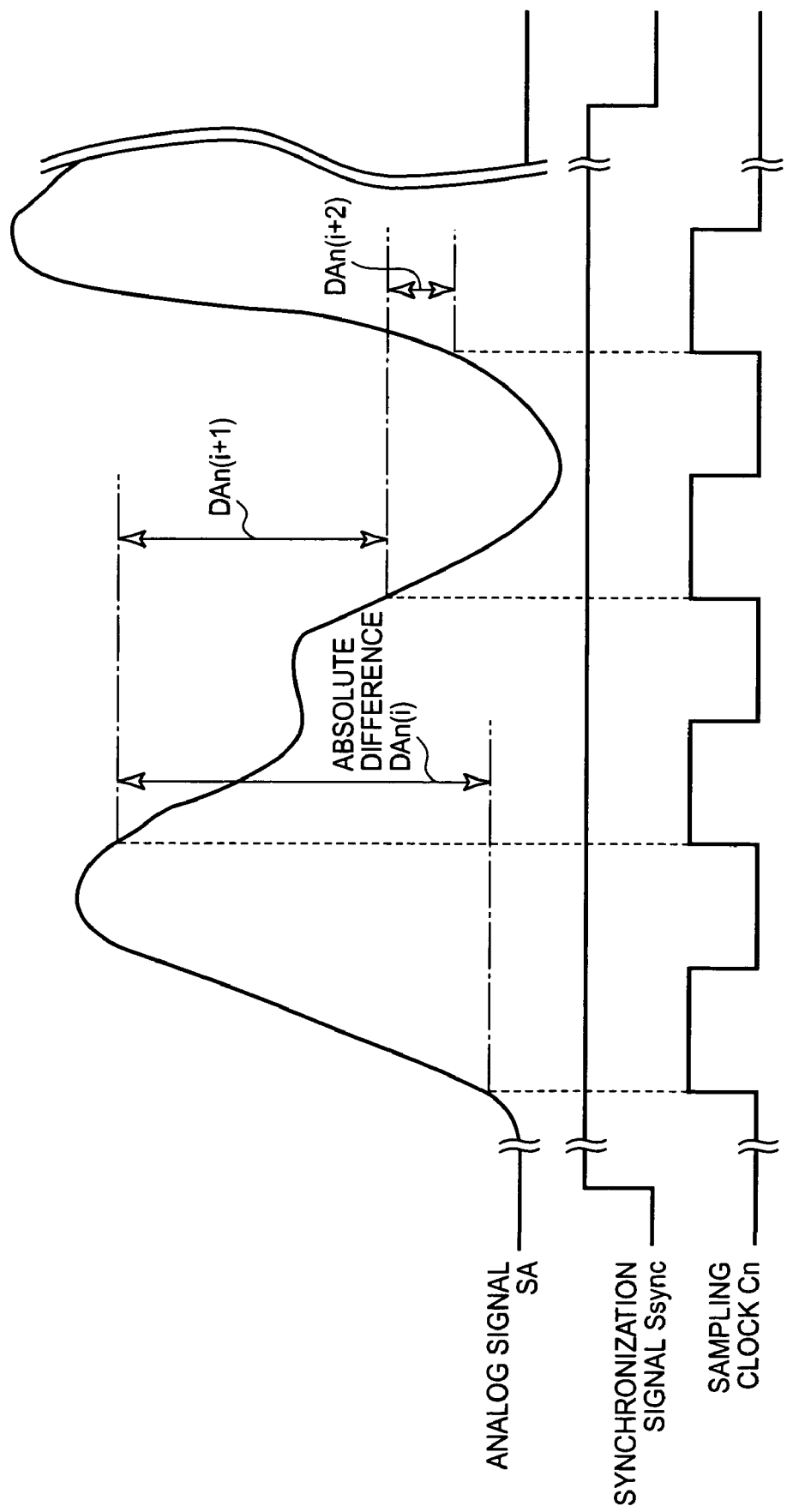
FIG. 16 is a view showing a detection operation example of a maximum difference in the signal processing circuit according to the related technique [2] of the present invention.
Figure 17:
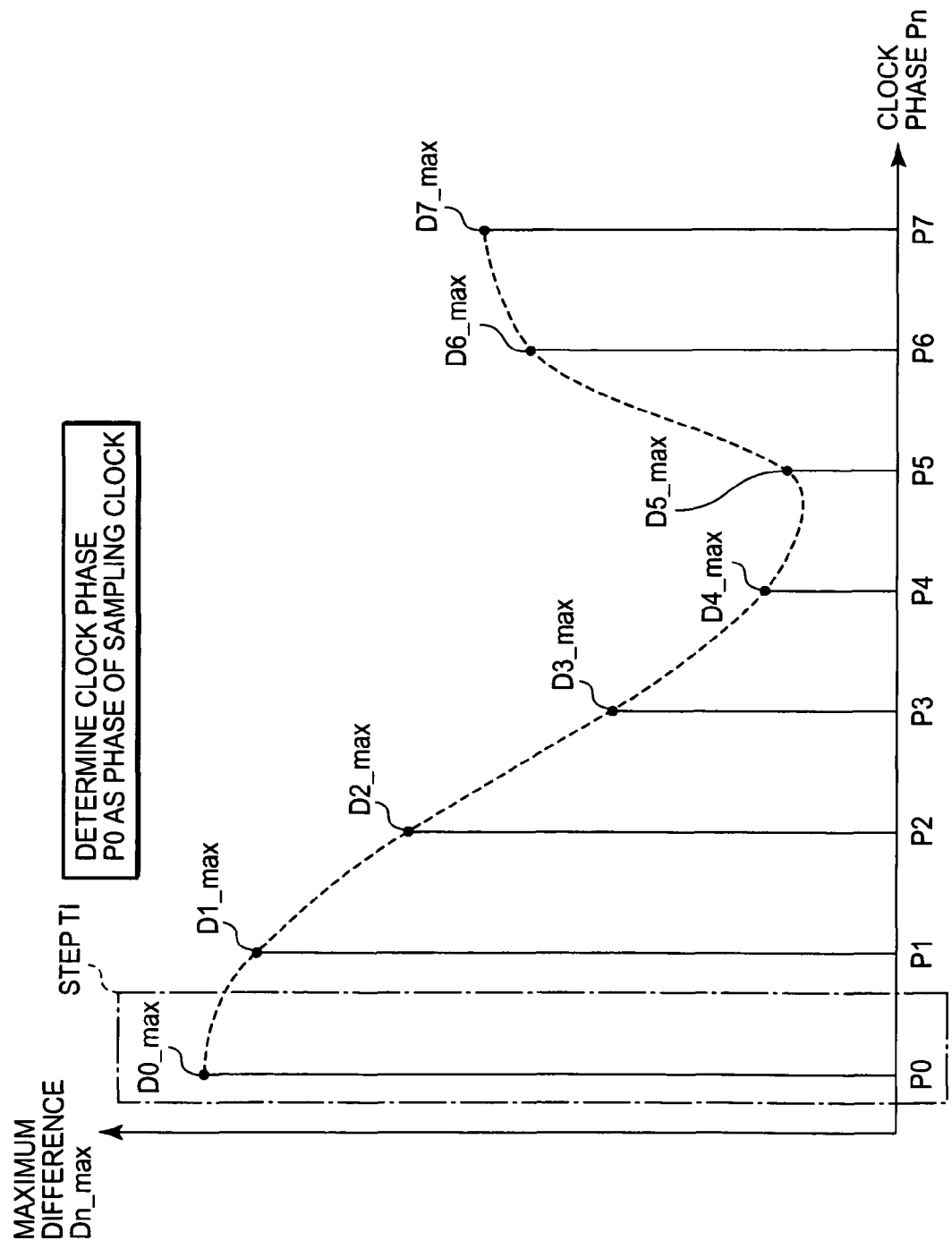
FIG. 17 is a view showing a phase adjustment operation example of a sampling clock in the signal processing circuit according to the related technique [2] of the present invention.

A maximum difference statistics unit 63c shown in FIG. 6 and used in this exemplary embodiment is different from the maximum difference statistics unit 63a in the above first exemplary embodiment in that, instead of the maximum value detector 635 shown in FIG. 2, a minimum value detector 637 is provided which detects a minimum value D_min of the absolute difference DA (hereinafter, referred to as the minimum difference) where the polarity change has been detected and which provides the phase informing unit 62 with the minimum difference as the statistical information ST shown in FIG. 1.

With regard to the operations, the minimum value detector 637 sequentially detects the minimum differences D0_min to Dn_min for the sampling clocks C0 to Cn and provides the minimum differences to the phase informing unit 62. The phase informing unit 62 extracts a clock phase corresponding to a minimum value among the minimum differences D0_min to Dn_min as an inappropriate phase, as well as determines an antiphase of the extracted phase as an appropriate phase of the sampling clock, similarly to Step S2 shown in FIG. 4.

Also in this case, the signal processing circuit 1 can automatically adjust a phase of a sampling clock without depending on the waveform of the digital signal SD, similarly to the above first exemplary embodiment. In addition, since the minimum difference D_min is used, it is possible to extract a phase of a sampling clock, from which smaller values can be obtained as the absolute difference upon polarity change, that is, a clock phase which can be more inappropriate.

Note that the present invention is not limited to the above exemplary embodiments, and it is obvious to those skilled in the art that various alterations can be made to the present invention based on the descriptions in the scope of claims.

Further, it is noted that Applicant's intent is to encompass equivalents of all claim elements, even if amended later during prosecution.

What is claimed is:

1. A signal processing method, comprising:
sampling an analog signal to convert the analog signal to a digital signal as a signal conversion; and
executing a phase determination, including:
   synchronizing the analog signal with sampling clocks having different phases, to obtain differences between each adjacent two signal levels in each sampled digital signal;
   monitoring a polarity change in the differences;
   extracting an inappropriate phase for use in sampling from the phases of the sampling clocks on a basis of absolute values of the differences where the polarity change is detected; and
   determining an antiphase of the inappropriate phase extracted as a phase of a sampling clock, to execute the signal conversion.

2. The signal processing method according to claim 1, wherein:
the phase determination includes extracting, as the inappropriate phase, among a respective maximum value of the absolute values of the differences where the polarity change is detected, a phase of a minimum value among the respective maximum value.

3. The signal processing method according to claim 1, wherein:
the phase determination includes extracting, as the inappropriate phase, among a total sum of the absolute values of the differences where the polarity change is detected, a phase of a minimum value among the total sum.

4. The signal processing method according to claim 1, wherein:
the phase determination includes extracting, as the inappropriate phase, among the absolute values of the differences where the polarity changes is detected, a phase of a minimum value among the absolute values.

5. A signal processing circuit, comprising:
a signal convertor which samples an analog signal, and converts the analog signal to a digital signal; and
a phase determination unit which obtains differences between each adjacent two signal levels in each sampled digital signal, by providing the signal convertor with sampling clocks with different phases, monitors a polarity change in the differences, extracts an inappropriate phase used for sampling among phases of the sampling clocks on a basis of absolute values of the differences where the polarity change has been detected, and determines an antiphase of the extracted phase as a phase of a sampling clock to be provided to the signal convertor.

6. The signal processing circuit according to claim 5, wherein the phase determination unit extracts, as the inappropriate phase, among a respective maximum value of the absolute values of the differences where the polarity change is detected, a phase of a minimum value among the respective maximum value.

7. The signal processing circuit according to claim 5, wherein the phase determination unit extracts, among a total sum of the absolute values of the differences where the polarity change is detected, a phase of a minimum value among the total sum.

8. The signal processing circuit according to claim 5, wherein the phase determination unit extracts as the inappropriate phase, among the absolute values of the differences where the polarity changes is detected, a phase of a minimum value among the absolute values.

9. A signal processing circuit, comprising:
an analog-to-digital converter which converts an analog signal to a digital signal, based on a plurality of sampling clocks;
a clock generator which generates the plurality of sampling clocks, based on a synchronization signal, a frequency data and a phase data;
a frequency informing unit which outputs the frequency data, based on the synchronization signal;
a phase informing unit which outputs the phase data, based on a statistical information; and
an absolute difference statistics unit which outputs the statistical information, based on the plurality of sampling clocks and the digital signal, by monitoring a phase change of the digital signal.

10. The signal processing circuit as claimed in claim 9, wherein the statistical information includes a data which corresponds to a minimum value among a plurality of differences between each adjacent two signal levels in each digital signal.

11. The signal processing circuit as claimed in claim 9, wherein the absolute difference statistics unit comprises:
a difference detector which receives the digital signal, and outputs a difference between each adjacent two signal levels in each sampled digital signal;
an absolute value detector which is responsive to the difference to output an absolute difference;
a polarity change monitor which receives the difference to output a selection signal when a polarity of the difference is changed; and
a selector which selectively selects the absolute difference and a predetermined value, based on the selection signal.

* * * * *